Dec. 1, 1931.   L. B. WILLOUGHBY   1,834,012
DOUGH CUTTING DEVICE
Filed April 22, 1931   2 Sheets-Sheet 1

Inventor
LIVELY B. WILLOUGHBY

By Dowell & Dowell
Attorneys.

Dec. 1, 1931.  L. B. WILLOUGHBY  1,834,012
DOUGH CUTTING DEVICE
Filed April 22, 1931  2 Sheets-Sheet 2
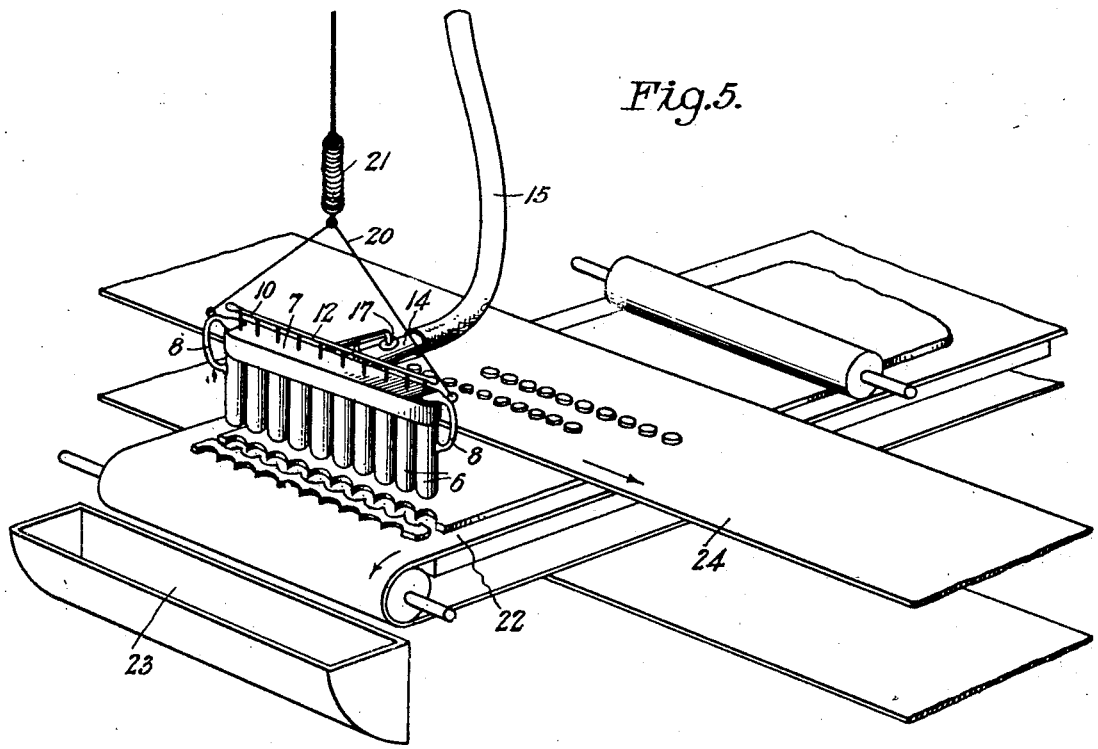
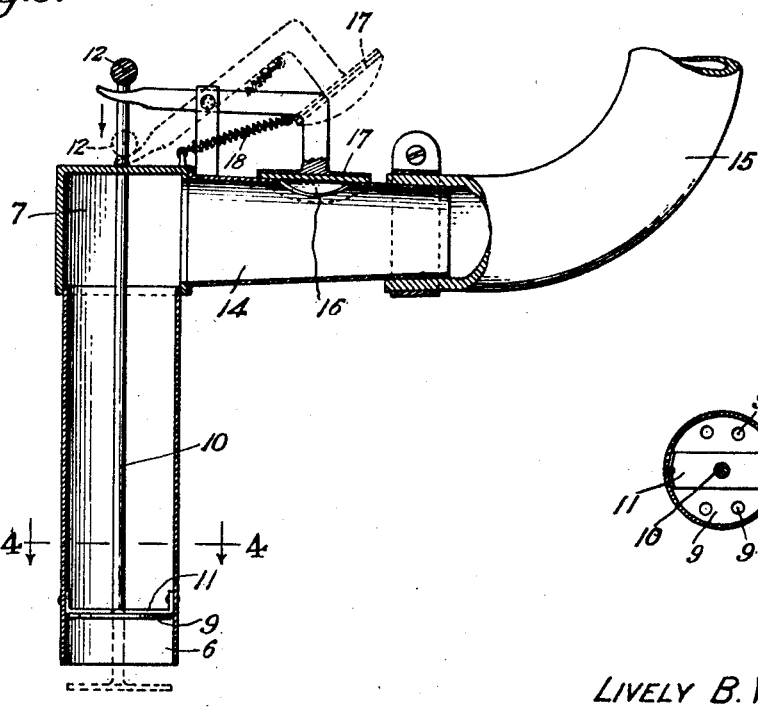
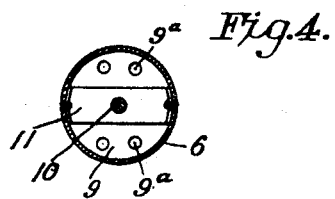
Inventor
LIVELY B. WILLOUGHBY
By Dowell & Dowell
Attorneys.

Patented Dec. 1, 1931

1,834,012

UNITED STATES PATENT OFFICE

LIVELY B. WILLOUGHBY, OF LOUISVILLE, KENTUCKY, ASSIGNOR TO BALLARD & BALLARD COMPANY, OF LOUISVILLE, KENTUCKY, A CORPORATION OF KENTUCKY

DOUGH CUTTING DEVICE

Application filed April 22, 1931. Serial No. 532,081.

This invention relates to dough cutting devices and is intended to provide such a device of construction affording speed and quantity production of various bakery manufactures.

Being adapted more especially for use in connection with the packeting of dough according to my pending application Serial No. 509,186 filed January 16, 1931 for process of packing uncooked food products, it will be described further with reference to the attached drawings illustrating one practical embodiment particularly appropriate to that purpose.

In said drawings:

Fig. 3 is a transverse section on the line 3—3 of Fig. 1;

Fig. 4 is a detailed view taken on the sectional line 4—4 of Fig. 3; and

Fig. 5 is a perspective view illustrating the use of the device.

Figure 1:
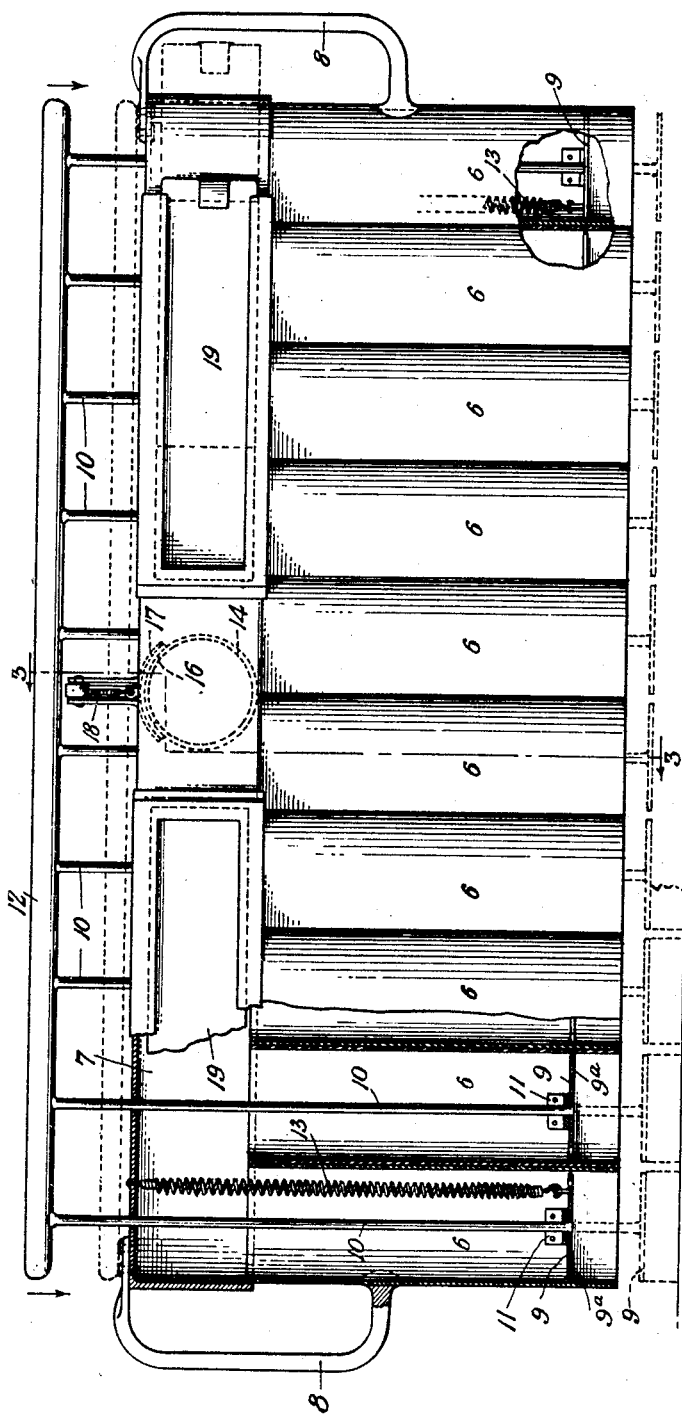
Fig. 1 is a front elevation of the device partly in section to show interior parts.
Figure 2:
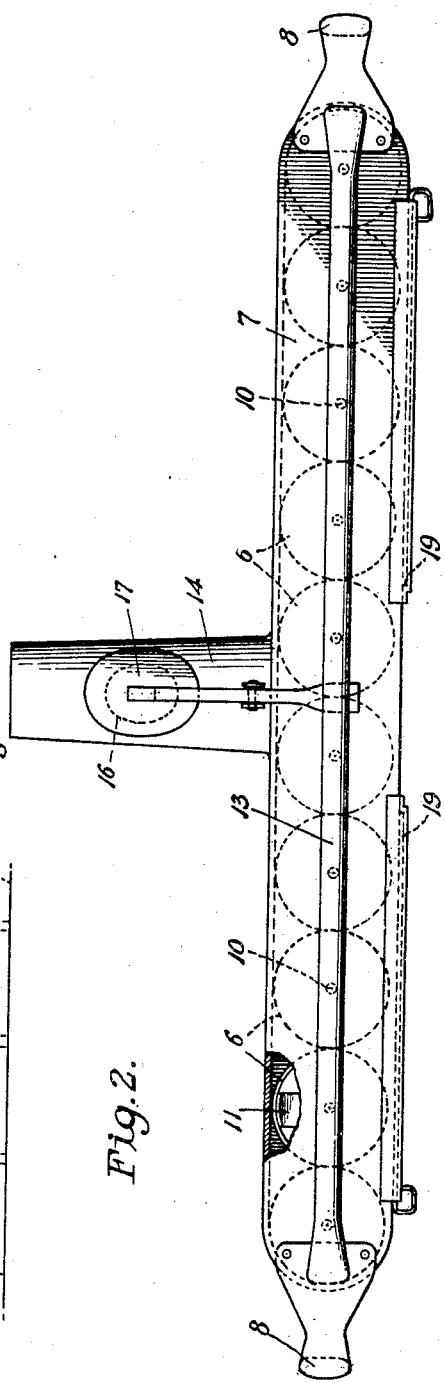
Fig. 2 is a plan view of the same.

The illustrative device is shown comprising a plurality of cutting tubes 6 arranged in a row of ten in this instance. They might of course be arranged circularly or otherwise as preference suggested. These tubes are formed or joined unitarily together with upper ends opening into a common chamber or hollowed head 7 and their lower ends terminating in the same plane. Handles 8 at opposite ends of the group assembly provide convenient means of holding between two hands for manipulation in cutting and discharge.

Said tubes have individual plunger elements advanceable therein to expel the dough cuttings and comprising disks 9 on sliderods 10 extending upwardly through the aforesaid chamber or head with suitable guiding at their lower ends as by spiders 11. If the disks of these plunger elements are made to conform to the tube interiors as here shown, they should be perforated at several points therearound as indicated at 9ª for a purpose which will become apparent.

The upper ends of the several rods connect with a common yoke-bar 12 extending across or along the unit with its ends in reach of the thumb or other finger of the hands grasping the aforementioned handles, thereby enabling it to be depressed while the device is held by the operator. This bar accordingly serves to advance the several plunger elements simultaneously, such being desirably against the tension of springs 13 at opposite ends fastened to the plunger disks of the extremital tubes so as to retract the plungers on release of the bar. Said guiding spiders serve advantageously to limit the inward movement of the plungers, which need not retract far within the tubes unless more than one cutting is to be accommodated therein, but are preferably adapted to advance slightly beyond the cutting ends of the tubes when actuated for expulsion as indicated by the dotted lines in Fig. 1.

A pipe-lead 14 at the back side of the aforementioned chamber or head serves for the attachment of a suction hose 15 connecting with a suction pump (not shown) through which suctional force is normally maintained in the several tubes. The openings in the disks of the plunger elements of course aid this by permitting air to be drawn upwardly therethrough into the tubes and chamber. An opening 16 in the lead however provides for breaking the suction in spite of pump action, while a valve 17 overseating said opening keeps it normally closed.

A spring 18 serves to seat said valve which is shown in the form of a rocking member fulcrumed with one arm underlying or connected to the aforementioned yoke-bar so as to be rocked to unseating or lifting of the valve when the bar is depressed. This of course breaks the suction simultaneously with actuation of the plungers.

Elongate hand-holes at the back side of the aforesaid head covered by slide plates 19 afford means of access thereinto for the purpose of cleaning or any interior adjustment necessary.

The described device facilitates cutting of the dough without necessity of gathering the cut pieces from the cutting table and so promotes production for packaging or baking in large quantities. The operator simply grasps the device by the handles at both ends and presses it down upon the rolled dough sheet rested on a cutting table. Very slight pressure is necessary because of its weight. The pieces of dough thus instantly cut are held by the suction in the cutting tubes and there drawn against the plunger elements. If the latter are disposed far enough up the tubes, several cuttings may be made to accumulate or gather the desired number of pieces in each tube before discharge. This would be desirable when a plurality of the pieces are to be packaged in stack relation. In that case of course the ten tubes would receive and hold ten stacks of the same.

The operator then lifts and swings the device over the table or surface onto which the cut pieces are assembled for packaging or placing in baking trays as the case may be and discharges the same thereonto by depressing the yoke-bar to unseat the valve and break the suction. The simultaneous actuation of the plunger elements of course expels the pieces either individually or in stacked relation according to the number drawn into the several tubes. It will be apparent that the suction breakage gives instant effect to the plungers for this purpose. The device is of course ready for repeated use on release of the yoke-bar to again seat the valve and retract the plungers.

For greater ease in manipulating the device, it may be slung or suspended from above on a wire or wires 20 having a spring 21 yielding to the cutting stroke or downward movement. Rapid production may be further promoted by feeding the rolled dough sheet toward the operator on an endless conveyor 22 passing over the cutting table and discharging the scrap particles of dough into a trough 23 from which to be gathered for rebatching and rolling. Another conveyor 24 at convenient level may serve as the discharge surface for delivery to a point of packing or arranging in baking trays as the case may be. This would reduce manipulation or shift back and forth to a minimum.

The device accordingly provides means for cutting, picking up and placing the dough in large quantities for packing or baking. As designed for use in connection with the method described in my aforesaid pending application, it cuts and stacks the exact number of dough pieces or formations for packeting into a merchandizable article. The special utility, novelty and advantage of the device, eliminating the necessity for expensive machinery will be obvious, especially to those familiar with bakers' manufactures on a large scale.

Having thus described my invention, what I claim as new and desire to secure by Letters Patent of the United States is:

1. In a dough cutter having an expeller, means for holding the cut dough pieces within the cutter form against said expeller combined with means for simultaneously releasing said means and operating said expeller.

2. In a dough cutter having an expeller, means functioning during the cutting operation for holding the cut pieces within the cutting form against said expeller after cutting and means operable to simultaneously interrupt the functioning of said first-named means and to actuate said expeller to discharge the pieces.

3. In a dough cutter having an expeller, means for holding the cut dough pieces by force of suction against said expeller within the cutting form and means operable to simultaneously break the suction action and actuate the expeller to discharge the pieces therefrom.

4. In a dough cutter having an expeller, means applying suction during the cutting operation to draw and hold the cut dough pieces therein against said expeller combined with means for simultaneously breaking the suction and actuating the expeller to discharge the pieces.

5. In a dough cutter, suction means for holding the cut dough pieces therein combined with plunger means operating thereagainst to expel the pieces therefrom.

6. In a dough cutter having a movable force-expulsion member therein, means applying suction to draw and hold the cut dough pieces within the cutter and means operable to alternately break and restore the suction action while simultaneously actuating the expulsion member.

7. In a dough cutter including a plunger member for expelling the pieces, means applying suction to draw and hold the cut dough pieces therein and means operable to alternately break and restore the suction action and to simultaneously advance and retract said plunger-member.

8. A dough cutter embodying a tubular body-member with open lower end, a plunger therein operable to expel dough pieces entering said end and a suction connection working through said plunger under control of a valve.

9. A dough cutter comprising a tubular receiver open at the cutting end, a plunger operable therein to expel the pieces of dough entering the same when cutting, a suction connection with said container for drawing the dough pieces thereinto by action through said plunger, and means simultaneously breaking the suction and actuating said plunger to expel the pieces.

10. A dough cutter comprising a tubular receiver open at the cutting end, a plunger movable axially therewithin, a suction connection behind said plunger and acting therethrough to draw cut dough pieces into the receiver, a valve operable to break the suction action and means simultaneously operating said valve and moving said plunger to expel the dough pieces.

11. In combination with a dough cutter having a plunger-member for expelling dough pieces received thereinto during cutting, means applying suction acting through said plunger to draw and hold the cut dough pieces within the cutter, and means operable to break the suction and move said plunger to expel the pieces.

12. In a dough cutter having a plunger for expelling the dough pieces received thereinto during cutting, means applying suction to draw and hold the pieces against the plunger when cut and means coordinated with the plunger for breaking the suction action when the plunger is operated to expel the pieces.

13. In a dough cutter, a tubular cutting member, an expelling plunger movable axially therein, an attachment for applying suction to draw and hold the cut dough pieces into the member, and means functioning to break the suction action when said plunger is actuated to expel the pieces.

14. A dough cutter comprising a grouped plurality of cutting members of tubular form each having a plunger movable axially therewithin, a suction attachment with the grouped cutters for applying a suction action therein through said plungers, means for opening the suction line to break the suction action and means operating the first-named means while simultaneously actuating said plungers.

15. A dough cutter comprising a unitary series of cutting members of tubular form opening into a common chamber, expelling plungers movable axially in said members, a suction line connection with said chamber for creating a suction action in each of the members, a valve-closed opening in the suction line for breaking the suction action when uncovered, and hand-operable means lifting the closure valve and simultaneously advancing the several plungers against spring tensioning.

In testimony whereof I affix my signature.

LIVELY B. WILLOUGHBY.